(12) United States Patent
Kitakami

(10) Patent No.: US 6,928,499 B2
(45) Date of Patent: Aug. 9, 2005

(54) MICROCOMPUTER USED IN SYSTEM HAVING EXTERNAL STORING UNIT AND/OR PERIPHERAL UNIT

(75) Inventor: Naoichi Kitakami, Tokyo (JP)

(73) Assignee: Renesas Technology Corp., Tokyo (JP)

(*) Notice: Subject to any disclaimer, the term of this patent is extended or adjusted under 35 U.S.C. 154(b) by 452 days.

(21) Appl. No.: 10/138,493

(22) Filed: May 6, 2002

(65) Prior Publication Data

US 2003/0097516 A1 May 22, 2003

(30) Foreign Application Priority Data

Nov. 16, 2001 (JP) ........................................ 2001-351850

(51) Int. Cl.[7] .............................................. G06F 13/00
(52) U.S. Cl. ...................................... 710/104; 710/107
(58) Field of Search ................................ 710/104, 105, 710/107, 316, 8, 10, 11, 14, 15, 16, 36, 62, 64, 72–74

(56) References Cited

U.S. PATENT DOCUMENTS

| | | | | |
|---|---|---|---|---|
| 5,347,636 A | * | 9/1994 | Ooi et al. | 711/203 |
| 6,292,407 B1 | * | 9/2001 | Porter et al. | 365/189.11 |
| 6,418,501 B1 | * | 7/2002 | Gama et al. | 710/305 |
| 6,445,316 B1 | * | 9/2002 | Hsu et al. | 341/120 |
| 6,530,062 B1 | * | 3/2003 | Liaw et al. | 716/2 |
| 6,711,073 B2 | * | 3/2004 | Martin | 365/198 |
| 2003/0056128 A1 | * | 3/2003 | Leddige et al. | 713/300 |

FOREIGN PATENT DOCUMENTS

| | | | |
|---|---|---|---|
| JP | A 7-6078 | 1/1995 | |
| JP | A 2001-100992 | 4/2001 | |
| WO | WO 8102479 A1 | * 9/1981 | ............. G06F/3/04 |

* cited by examiner

Primary Examiner—Tim Vo
Assistant Examiner—Trisha Vu
(74) Attorney, Agent, or Firm—Burns, Doane, Swecker & Mathis LLP

(57) ABSTRACT

An external area judging unit judges according to an address signal of a CPU whether the access to an external memory or the access to a peripheral unit is desired. In cases where the access to the external memory (or the peripheral unit) is desired, a bus selection signal indicating the external memory (or the peripheral unit) is sent to a bus control unit, and a plurality of bus control signals received in the bus control unit from the CPU are sent to the external memory (or the peripheral unit) as a plurality of external bus signals based on a bus timing for the external memory (or the peripheral unit) to make the CPU gain access to the external memory (or the peripheral unit).

9 Claims, 12 Drawing Sheets

MICROCOMPUTER USED IN SYSTEM HAVING EXTERNAL STORING UNIT AND/OR PERIPHERAL UNIT

BACKGROUND OF THE INVENTION

1. Field of the Invention

The present invention relates to a microcomputer used in a system having an external storing unit and/or a peripheral unit such as an application specific integrated circuit.

2. Description of Related Art

An external storing unit (hereinafter, called an external memory) and a peripheral unit such as an application specific integrated circuit (ASIC) are generally used for a system in which a microcomputer is used. In this case, to perform a program of a central processing unit (CPU) of the microcomputer, the CPU gains access to data stored in the external memory or data of the ASIC.

In a system using the microcomputer, an execution rate for a program of the CPU considerably influences on the performance of the microcomputer. In other words, a reading speed of data from the external memory and a writing speed of data to the external memory influence on the performance of the microcomputer. Therefore, a type of external bus interface disposed in the microcomputer corresponds to a timing specification of the external memory, and it is not fundamentally required of the microcomputer having the external bus interface corresponding to a timing specification of the external memory to set a setup time or a hold time between signals. Therefore, an access time is given as sufficient as possible in case of the external bus interface corresponding to a timing specification of the external memory. Also, the microcomputer having another type of external bus interface can gain access to various types of ASICs, and it is required of the microcomputer having the external bus interface corresponding to a timing specification of the ASIC to sufficiently set a setup time and a hold time between signals.

In a prior art, an external bus timing of the microcomputer is set to the external bus timing corresponding to only one of the two types of external bus interfaces of the microcomputer. Therefore, in cases where a microcomputer is used in a system having an external memory and an ASIC in external areas, the performance of the microcomputer in an execution rate for a program deteriorates when the microcomputer gains access to the external memory, it is difficult for the microcomputer to gain access to the ASIC, or it is impossible for the microcomputer to gain access to the ASIC.

Also, in cases where a bus cycle is shortened due to the heightening of an operation speed of the microcomputer used in a system having an external memory and/or an ASIC, it is required to shorten a rise time or a fall time of a signal output from the microcomputer to an external memory or an ASIC. Therefore, a driving performance of an output driver of the microcomputer is set to become stronger.

However, in cases where an output impedance of the output driver is lower than a characteristic impedance of a substrate on which the external memory and/or the ASIC are displaced with the microcomputer, ringing occurs due to the reflection of a signal between the microcomputer and the external memory or between the microcomputer and the ASIC, the system including the microcomputer is erroneously operated, and radiation noise occurs in the system.

Also, the characteristic impedance of the substrate is changed in dependence on the system. Therefore, there is a case where the output impedance of the output driver of the microcomputer differs from the characteristic impedance of the substrate when the output impedance of the output driver of the microcomputer is fixed. In this case, ringing or signal delay occurs due to the difference between the output impedance of the output driver and the characteristic impedance of the substrate.

As is described above, because the conventional microcomputer has the above-described configuration, in cases where the conventional microcomputer is used in a system having the external memory and the ASIC in external areas, a problem has arisen that the performance of an execution rate of the microcomputer deteriorates.

Also, in cases where the output impedance of the output driver of the microcomputer differs from the characteristic impedance of the substrate in a system having the external memory and/or the ASIC in external areas or an external area, a problem has arisen that the performance of an execution rate of the microcomputer deteriorates.

SUMMARY OF THE INVENTION

An object of the present invention is to provide, with due consideration to the drawbacks of the conventional microcomputer, a microcomputer in which the performance of an execution rate is prevented from being lowered in a system having an external storing unit and/or a peripheral unit in external areas or an external area.

The object is achieved by the provision of a microcomputer including an external area judging unit for judging according to a bus control signal output from a central processing unit whether access of the central processing unit to an external storing unit is set or access of the central processing unit to a peripheral unit is set and outputting a bus selection signal according to a judgment result, and a bus control unit, in which a bus interface having both a bus timing for the external storing unit and a bus timing for the peripheral unit is disposed, for sending a plurality of bus control signals output from the central processing unit to the external storing unit as a plurality of external bus signals based on the bus timing for the external storing unit, in a case where the bus selection signal output from the external area judging unit indicates the access to the external storing unit, to make the central processing unit gain access to the external storing unit, and sending the bus control signals output from the central processing unit to the peripheral unit as a plurality of external bus signals based on the bus timing for the peripheral unit, in a case where the bus selection signal output from the external area judging unit indicates the access to the peripheral unit, to make the central processing unit gain access to the peripheral unit.

In the above configuration, even though the microcomputer is used in a system having both an external storing unit and a peripheral unit in external areas respectively, the central processing unit can gain access to the external storing unit at an optimum bus timing for the external storing unit in cases where the access of the central processing unit to the external storing unit is desired, the central processing unit can gain access to the peripheral unit at an optimum bus timing for the peripheral unit in cases where the access of the central processing unit to the peripheral unit is desired, and the optimum bus timing for the external storing unit differs from the optimum bus timing for the peripheral unit. Accordingly, even though the microcomputer is used in the system having both the external storing unit and the peripheral unit in external areas respectively, the performance of an execution rate in the access of the central processing unit to the external storing unit can be prevented from being lowered.

The object is also achieved by the provision of a microcomputer including an output impedance control circuit for outputting an output impedance selection signal according to a selection signal received at an output impedance select terminal, and a bus control unit, in which an output driver having a plurality of output impedances is disposed, for selecting one output impedance from the output impedances according to the output impedance selection signal output from the output impedance control circuit, and outputting a plurality of bus control signals output from a central processing unit to a substrate as a plurality of external bus signals based on the selected output impedance.

In the above configuration, even though the microcomputer is used in a system having an external storing unit and/or a peripheral unit in external areas or an external area, one output impedance nearest to a characteristic impedance of the substrate, on which the external storing unit and/or the peripheral unit are disposed, is selected from the output impedances by the output driver of the bus control unit according to the selection signal received at the output impedance select terminal. Accordingly, the occurrence of noise, the erroneous operation of the microcomputer and the signal delay due to the mismatch of the output impedance of the output driver and the characteristic impedance of the substrate can be reduced, and the performance of an execution rate can be further prevented from being lowered.

The object is also achieved by the provision of a microcomputer including an output impedance control flag, set according to a flag control signal output from a central processing unit, for outputting an output impedance selection signal, and a bus control unit, in which an output driver having a plurality of output impedances is disposed, for selecting one output impedance from the output impedances according to the output impedance selection signal output from the output impedance control flag, and outputting a plurality of bus control signals output from the central processing unit to a substrate as a plurality of external bus signals based on the selected output impedance.

In the above configuration, even though the microcomputer is used in a system having an external storing unit and/or a peripheral unit in external areas or an external area, one output impedance nearest to a characteristic impedance of the substrate, on which the external storing unit and/or the peripheral unit are disposed, is selected from the output impedances by the output driver of the bus control unit according to the output impedance selection signal output from the output impedance control flag. Accordingly, the occurrence of noise, the erroneous operation of the microcomputer and the signal delay due to the mismatch of the output impedance of the output driver and the characteristic impedance of the substrate can be reduced, and the performance of an execution rate can be further prevented from being lowered.

DETAILED DESCRIPTION OF THE PREFERRED EMBODIMENTS

Embodiments of the present invention will now be described with reference to the accompanying drawings.

Embodiment 1

Figure 1:
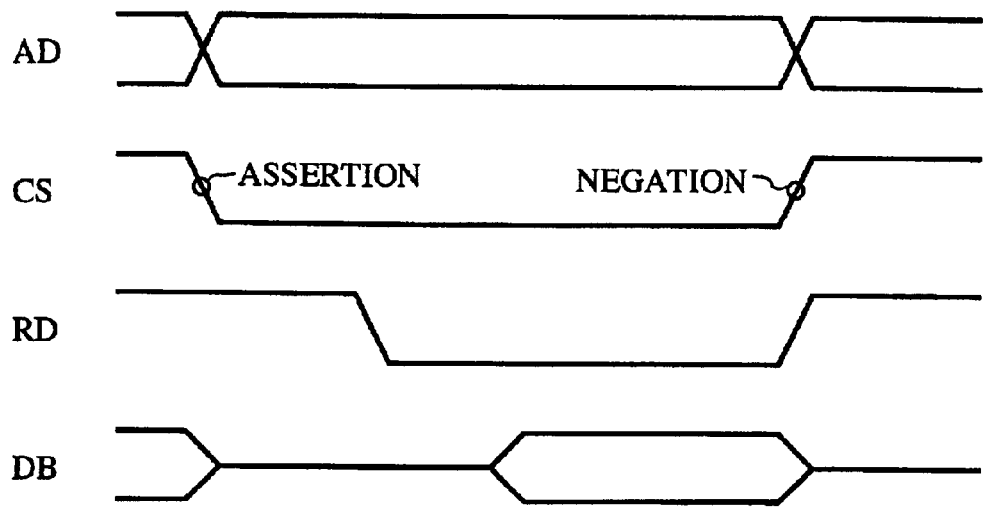
FIG. 1 is a timing chart showing a read bus timing of a microcomputer according to a first embodiment of the present invention in cases where the access of the microcomputer to an external memory is desired.
Figure 2:
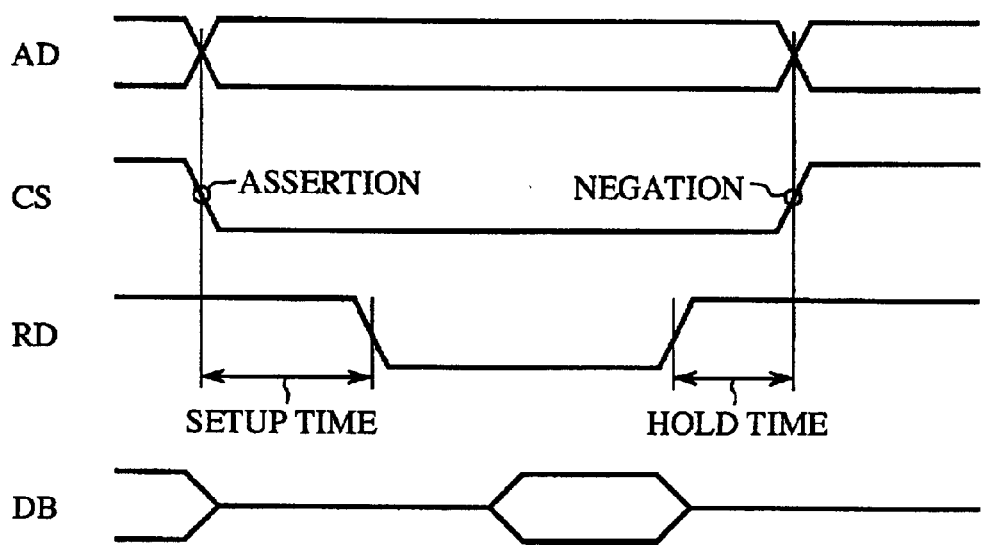
FIG. 2 is a timing chart showing a read bus timing of the microcomputer according to the first embodiment of the present invention in cases where the access of the microcomputer to an ASIC is desired.

FIG. 1 is a timing chart showing a read bus timing of a microcomputer according to a first embodiment of the present invention in cases where the access of the microcomputer to an external memory (or an external storing unit) is desired, and FIG. 2 is a timing chart showing a read bus timing of the microcomputer according to the first embodiment of the present invention in cases where the access of the microcomputer to an application specific integrated circuit (ASIC) (or a peripheral unit) is desired. In FIG. 1 and FIG. 2, AD denotes an address signal, CS denotes a chip selection signal, RD denotes a read signal, and DB denotes data.

Figure 3:
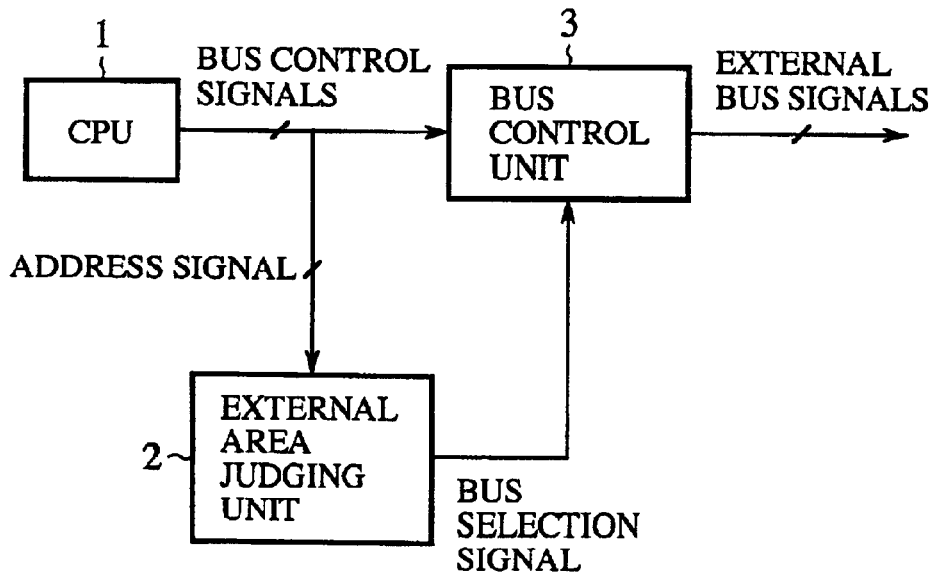
FIG. 3 is a block diagram of the microcomputer according to the first embodiment of the present invention.

Also, FIG. 3 is a block diagram of the microcomputer according to the first embodiment of the present invention. In FIG. 3, 1 indicates a central processing unit (CPU) for outputting a plurality of bus control signals such as an address signal AD, a chip selection signal CS and a read signal RD and receiving data DB read out from an external memory or an ASIC. 2 indicates an external area judging unit for judging according to the address signal AD (or the chip selector signal CS) output from the CPU 1 whether the access of the bus control signals (the address signal AD, the chip selection signal CS and the read signal RD) to an external memory is desired or the access of the bus control signals to an ASIC is desired and outputting a bus selection signal corresponding to a judging result. 3 indicates a bus control unit, in which an external bus interface having both a read bus timing for the external memory shown in FIG. 1 and a read bus timing for the ASIC shown in FIG. 2 is disposed, for sending the bus control signals to the external memory as a plurality of external bus signals based on the bus timing for the external memory to make the CPU 1 gain access to the external memory in cases where the bus selection signal of the external area judging unit 2 indicates the access to the external memory and sending the bus control signals to the ASIC as a plurality of external bus signals based on the bus timing for the ASIC to make the CPU 1 gain access to the ASIC in cases where the bus selection signal of the external area judging unit 2 indicates the access to the ASIC.

Figure 4:
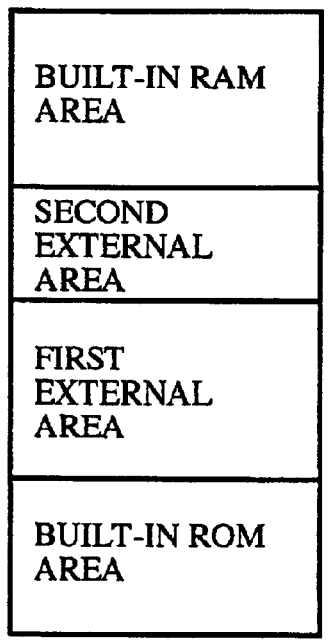
FIG. 4 is a conceptual view showing an external memory map in a system having both an external memory and an ASIC according to the first embodiment of the present invention.

FIG. 4 is a conceptual view showing an external memory map in external areas of a system having both the external memory and the ASIC according to the first embodiment of the present invention. As shown in FIG. 4, the external memory is placed in a first external area, and the ASIC is placed in a second external area.

Next, an operation of the microcomputer will be described below.

The external area judging unit 2 is, for example, formed of a comparator, and an address signal AD output from the CPU 1 is always monitored, and it is judged whether the address signal AD indicates the first external area or the second external area.

To perform a program of the CPU 1, in cases where it is desired to read out data DB from the external memory of the first external area, the address signal AD indicating the first external area is received in the external area judging unit 2, and no bus selection signal is asserted to the bus control unit 3 in response to the address signal AD. In other words, a bus selection signal set to a low level is output to the bus control unit 3. In the bus control unit 3, because no bus selection signal is asserted, a read bus timing for the external memory is selected, the timing of a plurality of bus control signals (the address signal AD, the chip selection signal CS and the read signal RD) output from the CPU 1 are adjusted to the bus timing for the external memory, and the bus control signals are sent to the external memory as a plurality of external bus signals based on the bus timing for the external memory. Therefore, the CPU 1 of the microcomputer gains access to the external memory at an optimum bus timing.

Next, to perform a program of the CPU 1, in cases where it is desired to read out data DB from the ASIC of the second external area, the address signal AD indicating the second external area is received in the external area judging unit 2, and a bus selection signal is asserted to the bus control unit 3 in response to the address signal AD. In other words, a bus selection signal set to a high level is output to the bus control unit 3. In the bus control unit 3, a read bus timing for the ASIC is selected in response to the bus selection signal, the timing of a plurality of bus control signals (the address signal AD, the chip selection signal CS and the read signal RD) output from the CPU 1 are adjusted to the bus timing for the ASIC, and the bus control signals are sent to the ASIC as a plurality of external bus signals based on the bus timing for the ASIC. Therefore, the CPU 1 of the microprocessor gains access to the ASIC at an optimum bus timing.

An example of a read bus timing of the microcomputer, which is planned to gain access to the external memory, is described in detail with reference to FIG. 1.

When a bus cycle is started, an address signal AD is output from the CPU 1 to the external area judging unit 2, and a chip selection signal CS of the CPU 1 is asserted to the bus control unit 3. After a time, a read signal RD of the CPU 1 is asserted to the bus control unit 3. Here, assuming that the read signal RD is asserted simultaneously with the start of the bus cycle, there is probability that data driven in this current bus cycle collides with data driven in a preceding bus cycle just before the current bus cycle. To prevent the collision of data, it is required to negate a read signal at the end of the preceding bus cycle. Therefore, the read signal RD is not asserted simultaneously with the start of the bus cycle.

Thereafter, data DB read out from the external memory is written to the CPU 1 at the end of the bus cycle, and the chip selection signal CS and the read signal RD of the CPU 1 are negated to the bus control unit 3 simultaneously with the writing of the data DB. Therefore, the change to a value required in a next bus cycle is started in an address bus. Because a hold time of the address signal AD and a hold time of the chip selection signal CS for the negation of the read signal RD in the external memory are normally equal to 0 nanosecond (ns) respectively, it is admitted that the read signal RD is negated simultaneously with the negation of the chip selection signal CS. Therefore, the hold time in the microcomputer is set to 0 ns in a timing specification of the external memory.

Therefore, the negation of the read signal RD can be delayed to the end of the bus cycle, and the data DB can be written in the CPU 1 at the end of the bus cycle. Accordingly, the most part of time period in each bus cycle can be used for the access of the CPU 1 to the external memory, an operation frequency of the microcomputer can be heightened so as to heighten the performance of the microcomputer, and an external memory having the characteristic of a long access time can be used. In other words, an external memory produced at a low cost can be used for the microcomputer.

Next, an example of a read bus timing of the microcomputer, which is planned to gain access to the ASIC, is described in detail with reference to FIG. 2.

As compared with the read bus timing for the external memory shown in FIG. 1, a hold time of the address signal AD and a hold time of the chip selection signal CS for the negation of the read signal RD in the ASIC are sufficiently given in the read bus timing for the ASIC.

Because it is required to write data DB read out from the ASIC in the CPU 1 until the negation of the read signal RD, a time period usable for the microcomputer in the access to the ASIC is shortened as compared with the read bus timing for the external memory shown in FIG. 1. However, as is described before, the performance of the microcomputer is mainly determined by the access time in the access to an external memory. Therefore, even though the access time in the access to the ASIC is shortened, adverse influence of the shortened access time on the performance of the microcomputer is low. Also, though the timing specification for the external memory is comparatively standardized, the specification of the bus timing for the ASIC required of the microcomputer depends on the specification, function, performance and design method of the microcomputer. Therefore, to satisfy the specification of the bus timing for the ASIC required of the microcomputer, it is required to sufficiently give both a setup time and a hold time between signals.

As is described above, in the first embodiment, even though the microcomputer is used in a system having both the external memory and the ASIC, the microcomputer can gain access to the external memory at the optimum bus timing when the access to the external memory is desired, and the microcomputer can gain access to the ASIC at the optimum bus timing when the access to the ASIC is desired. Accordingly, the performance of a program execution rate of the microcomputer can be prevented from being lowered.

In the first embodiment, as shown in FIG. 1 and FIG. 2, a group of the setup time and the hold time of both the address signal AD and the chip selection signal CS for the read signal RD is not set in the reading bus timing for the external memory but is set in the reading bus timing for the ASIC. However, in cases where a writing operation is performed by the CPU 1, it is applicable that a group of a setup time and a hold time of both the address signal AD and the chip selection signal CS for a write signal WR be not set in a writing bus timing for the external memory but be set in a writing bus timing for the ASIC.

Embodiment 2

Figure 5:
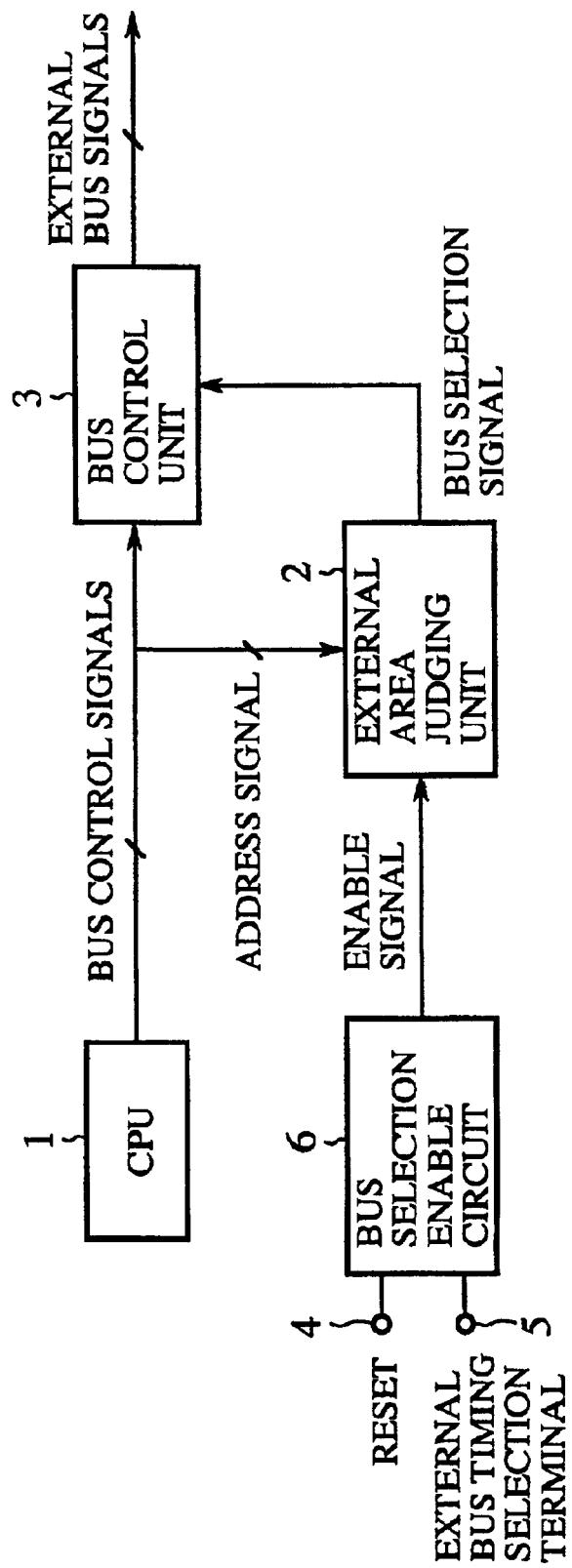
FIG. 5 is a block diagram of the microcomputer according to a second embodiment of the present invention.

FIG. 5 is a block diagram of a microcomputer according to a second embodiment of the present invention. The constituent elements, which are the same as those shown in FIG. 3, are indicated by the same reference numerals as those of the constituent elements shown in FIG. 3, and additional description of those constituent elements is omitted.

Figure 6:
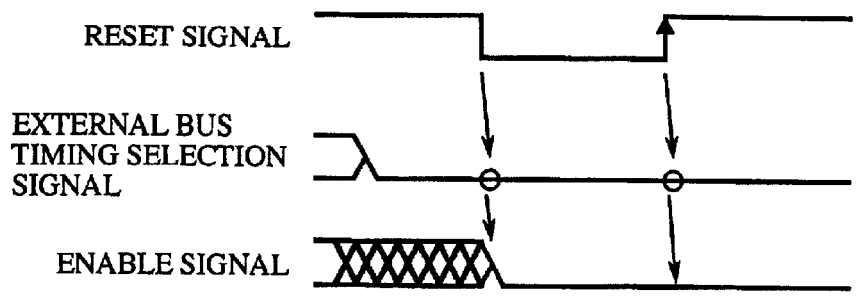
FIG. 6 is a timing chart showing an operation of a bus selection enable circuit of the microcomputer according to the second embodiment in cases where the microcomputer is used in a system having no ASIC but having a plurality of external memories.
Figure 7:
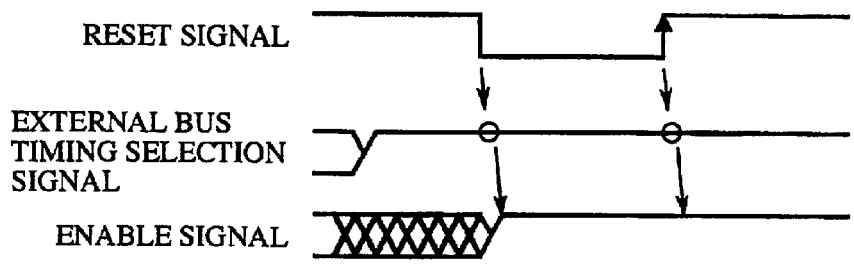
FIG. 7 is a timing chart showing an operation of the bus selection enable circuit 6 of the microcomputer according to the second embodiment in cases where the microcomputer is used in a system having both an ASIC and an external memory.

In FIG. 5, 4 indicates a reset terminal at which a reset signal is received. 5 indicates an external bus timing selection terminal at which a selection signal is received. 6 indicates a bus selection enable circuit for permitting or prohibiting the judging operation of the external area judging unit 2 according to a level of the selection signal latched by the reset signal, asserting an enable signal to the external area judging unit 2, in cases where the judging operation of the external area judging unit 2 is permitted, to make the external area judging unit 2 perform the judging operation, and asserting no enable signal to the external area judging unit 2, in cases where the judging operation of the external area judging unit 2 is prohibited, to make the external area judging unit 2 always output the bus selection signal indicating the external memory. FIG. 6 is a timing chart showing an operation of the bus selection enable circuit 6 of the microcomputer used in a system having no ASIC but having a plurality of external memories, and FIG. 7 is a timing chart showing an operation of the bus selection enable circuit 6 of the microcomputer used in a system having both an ASIC and an external memory.

Next, an operation of the microcomputer will be described below.

There is a case where the microcomputer is used in a system having no ASIC but having a plurality of external memories in a plurality of external areas. Assuming that the microcomputer according to the first embodiment is used in this system having no ASIC, an external memory is disposed in the second external area in place of the ASIC, and a read bus timing for the ASIC is erroneously selected by the bus control unit 3 in cases where the CPU 1 gains access to an external memory placed in the second external area. Therefore, the performance of a program execution rate of the microcomputer is undesirably lowered. To prevent this problem, in cases where the microcomputer is used in the system having no ASIC but having a plurality of external memories, it is required to always select a read bus timing for the external memory in the bus control unit 3.

In the second embodiment, in cases where the microcomputer is used in the system having no ASIC but having a plurality of external memories, as shown in FIG. 6, an external bus timing selection signal set to a low level is input to the external bus timing selection terminal 5, and a reset signal is input to the reset terminal 4. In the bus selection enable circuit 6, the external bus timing selection signal is latched by the reset signal. Because the external bus timing selection signal latched by the reset signal is set to the low level, no enable signal is asserted to the external area judging unit 2. In other words, an enable signal set to a low level is output to the external area judging unit 2. In this case, no judging operation based on the address signal AD is performed in the external area judging unit 2, and no bus selection signal is asserted to the bus control unit 3. Therefore, the bus timing for the external memory is selected in the bus control unit 3, and the CPU 1 gains access to one external memory at the bus timing for the external memory. That is to say, regardless of whether an external memory is placed in the first or second external area, the bus control signals output from the CPU 1 are sent to the external memory as a plurality of external bus signals based on the bus timing for the external memory. Therefore, the CPU 1 of the microprocessor gains access to the external memory at an optimum bus timing.

Also, in cases where the microcomputer is used in the system having both an external memory placed in the first external area and an ASIC placed in the second external area, as shown in FIG. 7, an external bus timing selection signal set to a high level is input to the external bus timing selection terminal 5, and a reset signal is input to the reset terminal 4. In the bus selection enable circuit 6, the external bus timing selection signal is latched by the reset signal. Because the external bus timing selection signal latched by the reset signal is set to the high level, an enable signal is asserted to the external area judging unit 2. In other words, an enable signal set to a high level is output to the external area judging unit 2. In this case, the judging operation based on the address signal is performed in the external area judging unit 2 in the same manner as in the first embodiment, and a bus selection signal is asserted to the bus control unit 3. Therefore, the bus control unit 3 is operated in the same manner as in the first embodiment.

As is described above, in the second embodiment, because the microcomputer further comprises a hardware configuration of the reset terminal 4, the external bus timing selection terminal 5 and the bus selection enable circuit 6, the function of the external area judging unit 2 can be changed so as to be adapted to the system having both an external memory and an ASIC, and the function of the external area judging unit 2 can be changed so as to be adapted to the system having no ASIC but having a plurality of external memories. Accordingly, even though the microcomputer is used in the system having no ASIC but having a plurality of external memories, there is no probability that the CPU 1 of the microcomputer tries to gain access to an external memory at the bus timing for the ASIC, and the performance of a program execution rate of the microcomputer in the access to the external memory can be further prevented from being lowered.

Embodiment 3

Figure 8:
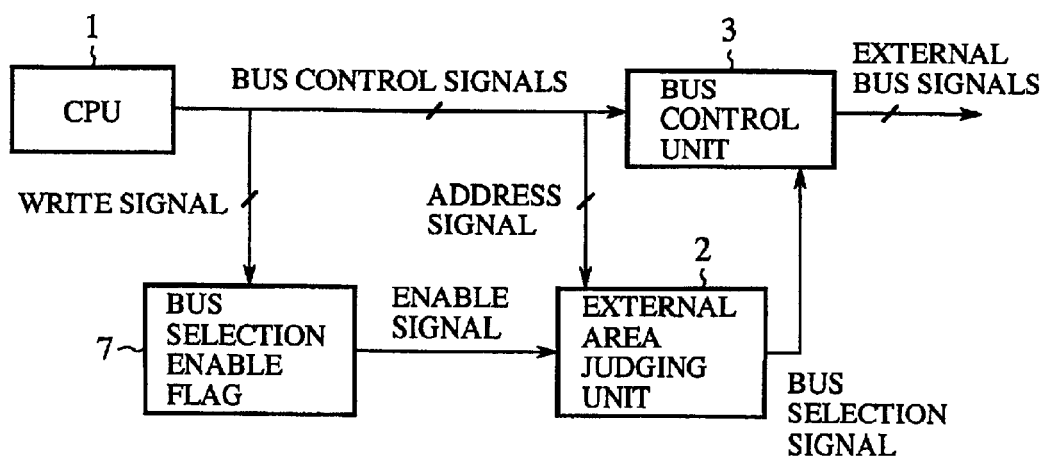
FIG. 8 is a block diagram of a microcomputer according to a third embodiment of the present invention.

FIG. 8 is a block diagram of a microcomputer according to a third embodiment of the present invention. The constituent elements, which are the same as those shown in FIG. 3, are indicated by the same reference numerals as those of the constituent elements shown in FIG. 3, and additional description of those constituent elements is omitted.

In FIG. 8, 7 indicates a bus selection enable flag for permitting or prohibiting the judgment of the external area judging unit 2 according to a level of internal data DB latched by a write signal (or a flag control signal) which is output from the CPU 1 to an internal memory, asserting an enable signal to the external area judging unit 2, in cases where the judgment of the external area judging unit 2 is permitted, to make the external area judging unit 2 output the bus selection signal indicating the access to the external memory or the access to the ASIC according to the judgment result, and asserting no enable signal to the external area judging unit 2, in cases where the judgment of the external area judging unit 2 is prohibited, to make the external area judging unit 2 always output the bus selection signal indicating the access to the external memory.

Figure 9:
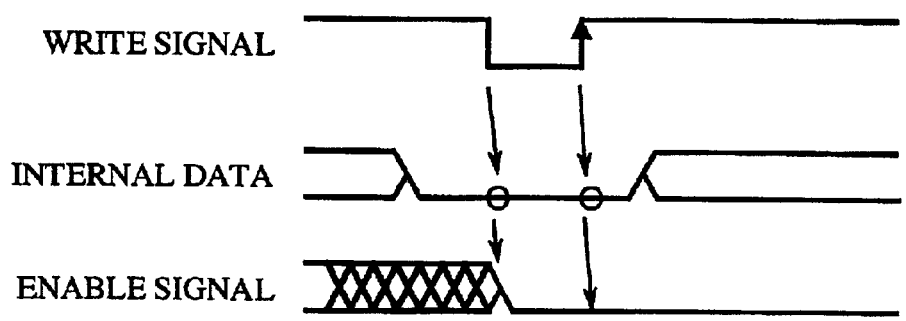
FIG. 9 is a timing chart showing an operation of a bus selection enable flag of the microcomputer according to the third embodiment in cases where the microcomputer is used in a system having no ASIC but having a plurality of external memories.
Figure 10:
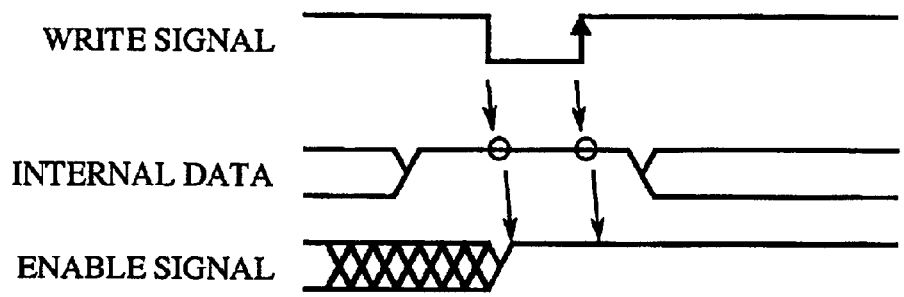
FIG. 10 is a timing chart showing an operation of a bus selection enable flag of the microcomputer according to the third embodiment in cases where the microcomputer is used in a system having both an ASIC and an external memory.

FIG. 9 is a timing chart showing an operation of the bus selection enable flag 7 of the microcomputer used in a system having no ASIC but having a plurality of external memories according to the third embodiment of the present invention, and FIG. 10 is a timing chart showing an operation of the bus selection enable flag 7 of the microcomputer used in a system having both an ASIC and an external memory according to the third embodiment of the present invention.

Next, an operation of the microcomputer will be described below.

In cases where the microcomputer is used in the system having no ASIC but having a plurality of external memories, as shown in FIG. 9, internal data DB set in a low level is latched by a write signal output from the CPU 1 to an internal memory, a value "0" of the internal data DB is written to the bus selection enable flag 7 by the CPU 1, and no enable signal is asserted to the external area judging unit 2. In other words, an enable signal set to a low level is output to the external area judging unit 2. In this case, no judging operation based on the address signal is performed in the external area judging unit 2, and no bus selection signal is asserted to the bus control unit 3. Therefore, the bus timing for the external memory is always selected in the bus control unit 3, and the CPU 1 of the microprocessor gains access to the external memory at the bus timing for the external memory.

Also, in cases where the microcomputer is used in the system having both an external memory and an ASIC, as shown in FIG. 10, internal data DB set in a high level is latched by a write signal output from the CPU 1 to an internal memory, a value "1" of the internal data DB is written to the bus selection enable flag 7 by the CPU 1, and an enable signal is asserted to the external area judging unit 2. In other words, an enable signal set to a high level is output to the external area judging unit 2. In this case, the judging operation based on the address signal is performed in the external area judging unit 2 in the same manner as in the first embodiment, and a bus selection signal is asserted to the bus control unit 3. Therefore, the bus control unit 3 is operated in the same manner as in the first embodiment.

As is described above, in the third embodiment, because the microcomputer further comprises a software configuration of the bus selection enable flag 7, the function of the external area judging unit 2 can be changed according to the bus selection enable flag 7 so as to be adapted to the system having both an external memory and an ASIC, and the function of the external area judging unit 2 can be changed according to the bus selection enable flag 7 so as to be adapted to the system having no ASIC but having a plurality of external memories. Accordingly, even though the microcomputer is used in the system having no ASIC but having a plurality of external memories, there is no probability that the CPU 1 of the microcomputer tries to gain access to an external memory at the bus timing for the ASIC, and the performance of a program execution rate of the microcomputer in the access to the external memory can be further prevented from being lowered.

Embodiment 4

Figure 11:
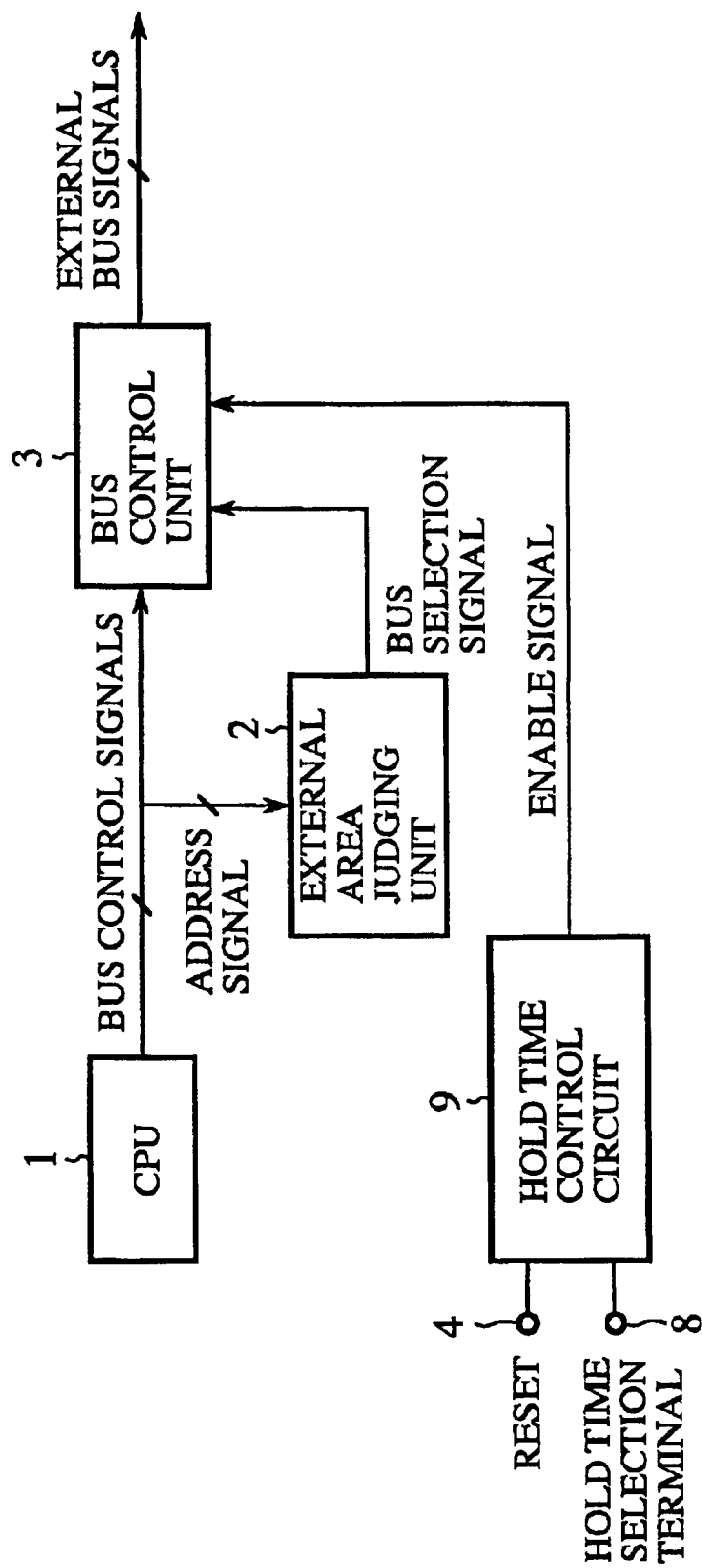
FIG. 11 is a block diagram of a microcomputer according to a fourth embodiment of the present invention.

FIG. 11 is a block diagram of a microcomputer according to a fourth embodiment of the present invention. The constituent elements, which are the same as those shown in FIG. 3, are indicated by the same reference numerals as those of the constituent elements shown in FIG. 3, and additional description of those constituent elements is omitted.

As shown in FIG. 11, 8 indicates a hold time selection terminal (or a time adjustment terminal) at which a hold time selection signal (or a time adjustment signal) is received. 9 indicates a hold time control circuit (or a time control circuit) for outputting an enable signal (or a control signal) to the bus control unit 3 according to a level of the hold time selection signal latched by the reset signal to make the bus control unit 3 change a hold time of the bus timing for the ASIC in a bus interface.

Figure 12:
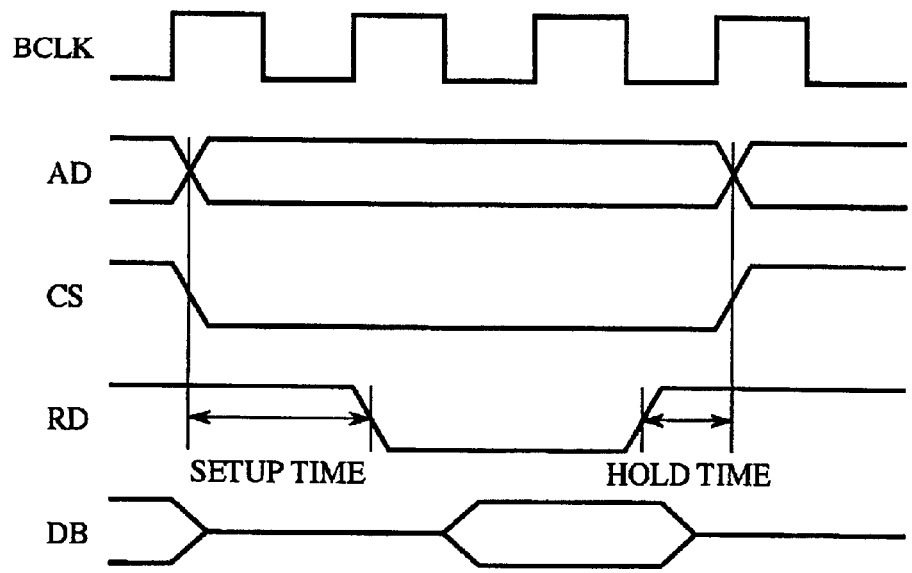
FIG. 12 is a timing chart showing a read bus timing of the microcomputer according to the fourth embodiment of the present invention in cases where a CPU of the microcomputer gains access to an ASIC at a hold time set to a half cycle of a clock signal.
Figure 13:
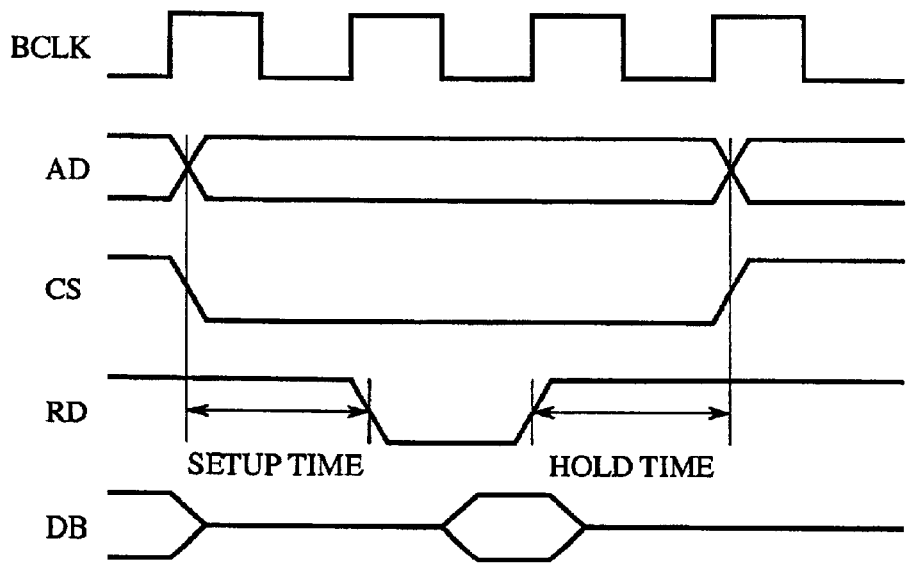
FIG. 13 is a timing chart showing a read bus timing of the microcomputer according to the fourth embodiment of the present invention in cases where a CPU of the microcomputer gains access to an ASIC at a hold time set to one cycle of a clock signal.

FIG. 12 is a timing chart showing a read bus timing of the microcomputer according to the fourth embodiment of the present invention in cases where the CPU 1 of the microcomputer gains access to the ASIC at a hold time set to a half cycle of a clock signal, and FIG. 13 is a timing chart showing a read bus timing of the microcomputer according to the fourth embodiment of the present invention in cases where the CPU 1 of the microcomputer gains access to the ASIC at a hold time set to one cycle of a clock signal. In FIG. 12 and FIG. 13, BCLK denotes a clock signal.

Next, an operation of the microcomputer will be described below.

To heighten the accessibility to the ASIC, it is useful to arbitrarily change the setup time and/or the hold time. Therefore, the hold time of both the address signal AD and the chip selection signal CS for the negation of the read signal RD described in the first embodiment is, for example, changed by using hardware elements in the fourth embodiment.

As shown in FIG. 11, the hold time of both the address signal AD and the chip selection signal CS for the negation of the read signal RD is set in the bus control unit 3 under the control of the hold time control circuit 9 according to a level of a hold time selection signal received at the hold time selection terminal 8. Also, the bus control signals such as the address signal AD, the chip selection signal CS and the read signal RD are formed in the CPU 1 in synchronization with the clock signal BCLK (not described in the first embodiment) in the same manner as in the first embodiment.

In cases where it is desired to set the hold time of both the address signal AD and the chip selection signal CS for the negation of the read signal RD to a shorter time period, as shown in FIG. 11 and FIG. 12, a hold time selection signal set to a low level in the CPU 1 is input to the hold time selection terminal 8, and a reset signal is input to the reset terminal 4. In the hold time control circuit 9, the hold time selection signal is latched by the reset signal. Because the hold time selection signal latched by the reset signal is set to the low level, no enable signal is asserted to the bus control unit 3. In other words, an enable signal set to a low level is output to the bus control unit 3. In this case, when a bus selection signal of the external area judging unit 2 is asserted to the bus control unit 3 to make the bus control unit 3 select the read bus timing for the ASIC, a first bus timing for the ASIC is selected by the bus control unit 3. In the first bus timing for the ASIC, the hold time of both the address signal AD and the chip selection signal CS for the negation of the read signal RD is set to a half cycle of the clock signal BCLK. Thereafter, the bus control signals of the CPU 1 is sent from the bus control unit 3 to the ASIC at the first bus timing for the ASIC, and the CPU 1 gains access to the ASIC at an optimum bus timing.

Also, in cases where it is desired to set the hold time of both the address signal AD and the chip selection signal CS for the negation of the read signal RD to a longer time period, as shown in FIG. 11 and FIG. 13, a hold time selection signal set to a high level is input to the hold time selection terminal 8, and a reset signal is input to the reset terminal 4. In the hold time control circuit 9, the hold time selection signal is latched by the reset signal. Because the hold time selection signal latched by the reset signal is set to the high level, an enable signal is asserted to the bus control unit 3. In other words, an enable signal set to a high level is output to the bus control unit 3. In this case, when a bus selection signal of the external area judging unit 2 is asserted to the bus control unit 3 to make the bus control unit 3 select the read bus timing for the ASIC, a second bus timing for the ASIC is selected by the bus control unit 3. In the second bus timing for the ASIC, the hold time of both the address signal AD and the chip selection signal CS for the negation of the read signal RD is set to one cycle of the clock signal BCLK. Thereafter, the bus control signals of the CPU 1 is sent from the bus control unit 3 to the ASIC at the second bus timing for the ASIC, and the CPU 1 gains access to the ASIC at an optimum bus timing.

In the fourth embodiment, the hold time of both the address signal AD and the chip selection signal CS for the negation of the read signal RD is changed. However, it is applicable that the hold time of both the address signal AD and the chip selection signal CS for the negation of a write signal WR be changed. Also, it is applicable that a setup time of both the address signal AD and the chip selection signal CS for the assertion of the read signal RD be changed.

Also, in the fourth embodiment, the reset terminal 4, the hold time selection terminal 8 and the hold time control circuit 9 are added to the microcomputer of the first embodiment. However, it is applicable that the reset terminal 4, the hold time selection terminal 8 and the hold time control circuit 9 be added to the microcomputer of the second embodiment.

Also, in the fourth embodiment, the hold time of both the address signal AD and the chip selection signal CS for the negation of the read signal RD is adjusted to one of two types of time periods. However, it is applicable that the hold time of both the address signal AD and the chip selection signal CS for the negation of the read signal RD be adjusted to a time period selected from three types of time periods or more. In this case, a plurality of hold time selection terminals 8 are used so as to feed one of three types of enable signals or more from the hold time control circuit 9 to the bus control unit 3.

As is described above, in the fourth embodiment, because the microcomputer further comprises a hardware configuration of the reset terminal 4, the hold time selection terminal 8 and the hold time control circuit 9, the hold time and/or the setup time of the bus interface in the bus control unit 3 can be changed according to the hold time selection signal input to the hold time selection terminal 8. Accordingly, the performance of the microcomputer can be improved.

Embodiment 5

Figure 14:
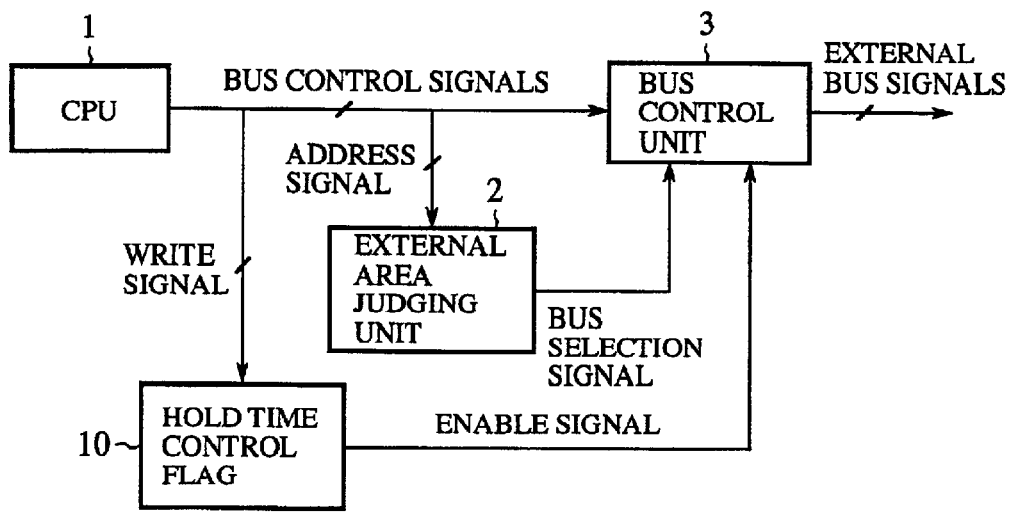
FIG. 14 is a block diagram of a microcomputer according to a fifth embodiment of the present invention.

FIG. 14 is a block diagram of a microcomputer according to a fifth embodiment of the present invention. The constituent elements, which are the same as those shown in FIG. 3, are indicated by the same reference numerals as those of the constituent elements shown in FIG. 3, and additional description of those constituent elements is omitted.

In FIG. 14, 10 indicates a hold time control flag (or a time control flag) for outputting an enable signal (or a control signal) to the bus control unit 3 to change the hold time of the bus interface in the bus timing for the ASIC according to a level of internal data DB latched by a write signal (or a flag control signal) which is output from the CPU 1 to an internal memory.

Next, an operation of the microcomputer will be described below.

The hold time of both the address signal AD and the chip selection signal CS for the negation of the read signal RD is changed in a software process.

In cases where it is desired to set the hold time to a shorter time period, as shown in FIG. 9 and FIG. 14, internal data DB set in a low level is latched by a write signal output from the CPU 1 to an internal memory, a value "0" of the internal data DB is written to the hold time control flag 10 by the CPU 1, and no enable signal is asserted to the bus control unit 3. In other words, an enable signal set to a low level is output to the bus control unit 3. In this case, when a bus selection signal of the external area judging unit 2 is asserted to the bus control unit 3 to make the bus control unit 3 select the read bus timing for the ASIC, a first bus timing for the ASIC is selected by the bus control unit 3. In the first bus timing for the ASIC, the hold time of both the address signal AD and the chip selection signal CS for the negation of the read signal RD is set to a half cycle of the clock signal BCLK. Thereafter, the bus control signals of the CPU 1 is sent from the bus control unit 3 to the ASIC at the first bus timing for the ASIC, and the CPU 1 gains access to the ASIC at an optimum bus timing.

Also, in cases where it is desired to set the hold time to a longer time period, as shown in FIG. 10 and FIG. 14, internal data DB set in a high level is latched by a write signal output to an internal memory from the CPU 1, a value "1" is written to the hold time control flag 10 by the CPU 1, and an enable signal is asserted to the bus control unit 3. In other words, an enable signal set to a high level is output to the bus control unit 3. In this case, when a bus selection signal of the external area judging unit 2 is asserted to the bus control unit 3 to make the bus control unit 3 select the read bus timing for the ASIC, a second bus timing for the ASIC is selected by the bus control unit 3. In the second bus timing for the ASIC, the hold time of both the address signal AD and the chip selection signal CS for the negation of the read signal RD is set to one cycle of the clock signal BCLK. Thereafter, the bus control signals of the CPU 1 is sent from the bus control unit 3 to the ASIC at the second bus timing for the ASIC, and the CPU 1 gains access to the ASIC at an optimum bus timing.

In the fifth embodiment, the hold time of both the address signal AD and the chip selection signal CS for the negation of the read signal RD is adjusted. However, it is applicable that the hold time of both the address signal AD and the chip selection signal CS for the negation of a write signal WR be adjusted. Also, it is applicable that the setup time of both the address signal AD and the chip selection signal CS for the assertion of the read signal RD be adjusted.

Also, in the fifth embodiment, the hold time control flag 10 is added to the microcomputer of the first embodiment. However, it is applicable that the hold time control flag 10 be added to the microcomputer of the third embodiment.

Also, in the fifth embodiment, the hold time of both the address signal AD and the chip selection signal CS for the negation of the read signal RD is microcomputer to one of two types of time periods. However, it is applicable that the hold time of both the address signal AD and the chip selection signal CS for the negation of the read signal RD be changed to a time period selected from three types of time periods or more. In this case, a plurality of hold time control flags 10 are used so as to feed one of three types of control signals or more from the hold time control flag 10 to the bus control unit 3.

As is described above, in the fifth embodiment, because the microcomputer further comprises a software configuration of the hold time control flag 10 set according to the write signal of the CPU 1, the hold time and the setup time of the bus interface in the bus control unit 3 can be adjusted according to the value of the hold time control flag 10. Accordingly, the performance of the microcomputer can be improved.

Embodiment 6

Figure 15:
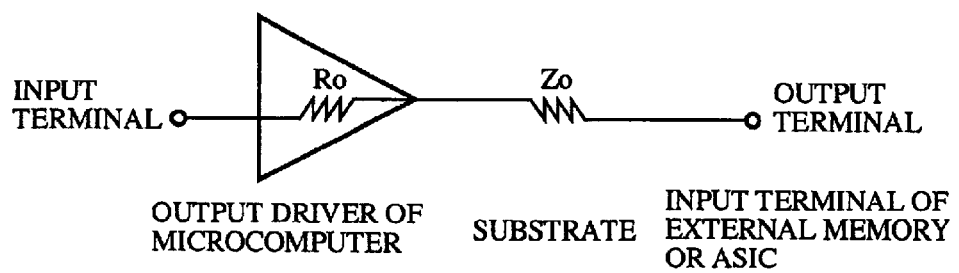
FIG. 15 is a circuit view showing an equivalent circuit of both an output driver of a microcomputer according to a sixth embodiment of the present invention and a substrate.

FIG. 15 is a circuit view showing an equivalent circuit of both an output driver of a microcomputer according to a sixth embodiment of the present invention and a substrate. In the sixth embodiment, the microcomputer is used in a system having either the external memory or the ASIC in an external area or a system having both the external memory and the ASIC in external areas.

Figure 16:
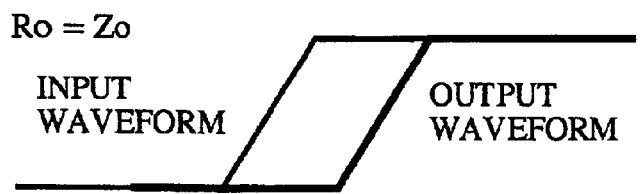
FIG. 16 shows both an input waveform and an output waveform of a bus control signal of the equivalent circuit in cases where an output impedance of the output driver is equal to a characteristic impedance of the substrate.
Figure 17:
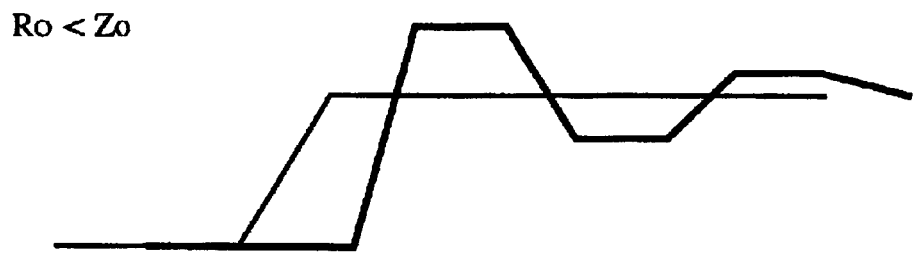
FIG. 17 shows both an input waveform and an output waveform of a bus control signal of the equivalent circuit in cases where an output impedance of the output driver is lower than a characteristic impedance of the substrate.
Figure 18:
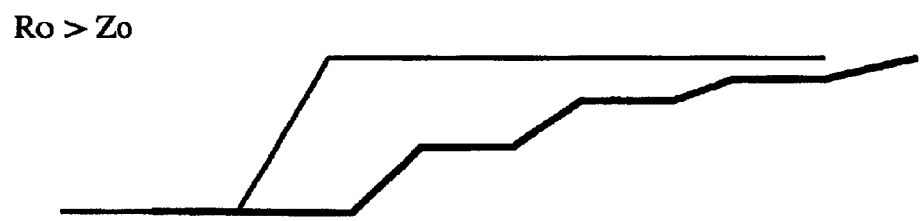
FIG. 18 shows both an input waveform and an output waveform of a bus control signal of the equivalent circuit in cases where an output impedance of the output driver is higher than an impedance of the substrate.
Figure 19:
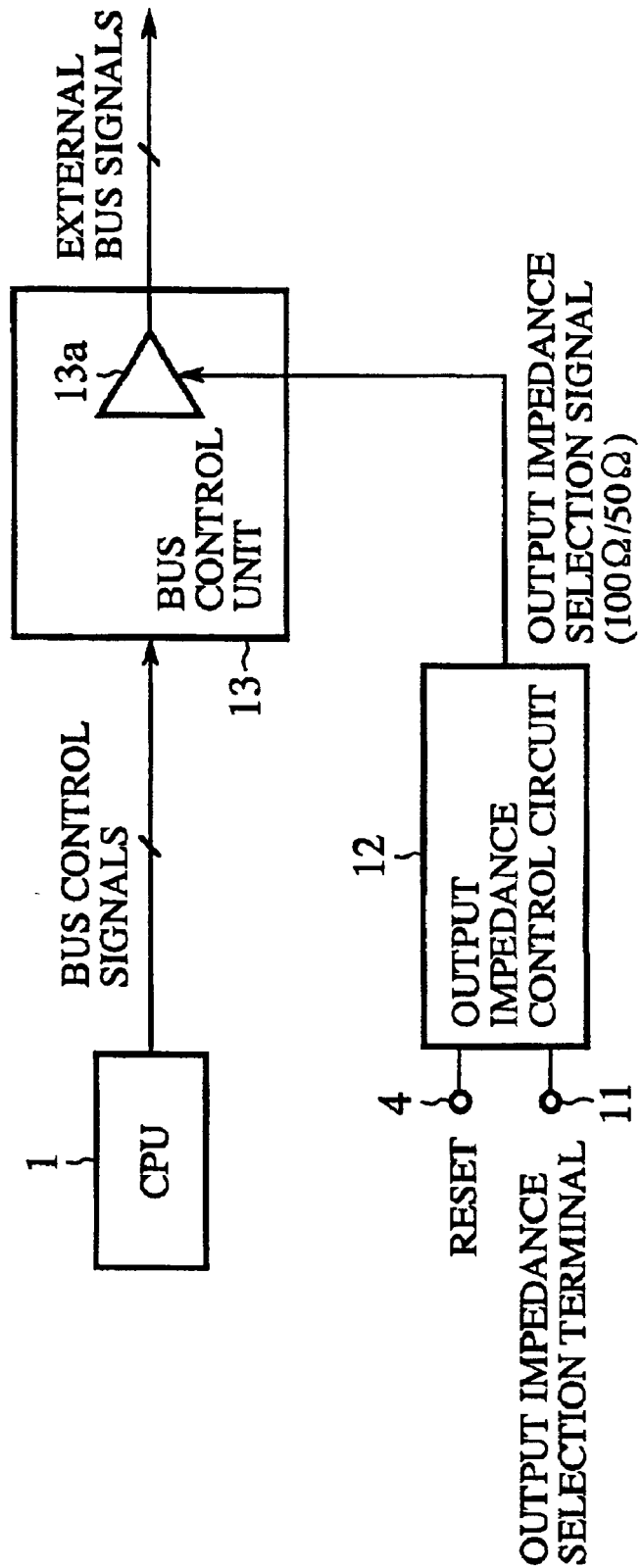
FIG. 19 is a block diagram of a microcomputer according to a sixth embodiment of the present invention.

FIG. 16 shows both an input waveform and an output waveform of a bus control signal of the equivalent circuit in cases where an output impedance of the output driver is equal to a characteristic impedance of the substrate, FIG. 17 shows both an input waveform and an output waveform of a bus control signal of the equivalent circuit in cases where an output impedance of the output driver is lower than a characteristic impedance of the substrate, and FIG. 18 shows both an input waveform and an output waveform of a bus control signal of the equivalent circuit in cases where an output impedance of the output driver is higher than a characteristic impedance of the substrate. Also, FIG. 19 is a block diagram of a microcomputer according to a sixth embodiment of the present invention. The constituent elements, which are the same as those shown in FIG. 3, are indicated by the same reference numerals as those of the constituent elements shown in FIG. 3, and additional description of those constituent elements is omitted.

In FIG. 19, 11 indicates an output impedance selection terminal at which a selection signal is received. 12 indicates an output impedance control circuit for outputting an output impedance selection signal according to a level of the selection signal latched by the reset signal. 13 indicates a bus control unit 13, in which an output driver 13a having two types of output impedances is disposed, for selecting one output impedance of the output driver 13a according to the output impedance selection signal and outputting a bus control signal output from the CPU 1 as a plurality of external bus signals based on the selected output impedance.

Figure 20:
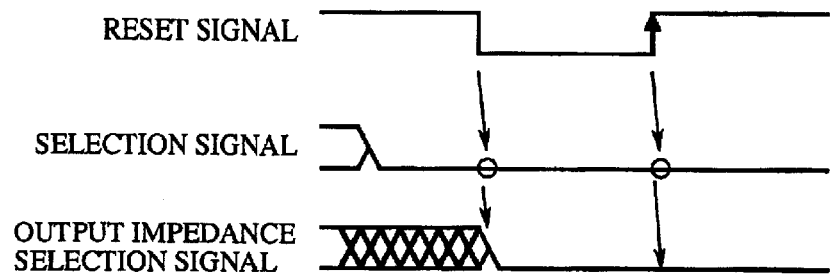
FIG. 20 is a timing chart showing an operation of an output impedance control circuit according to the sixth embodiment of the present invention in cases where no output impedance selection signal of the output impedance control circuit is asserted to an output driver.
Figure 21:
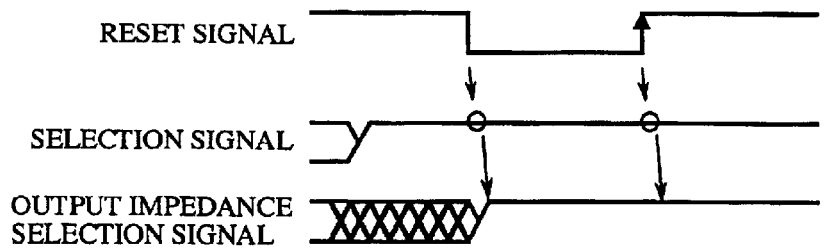
FIG. 21 is a timing chart showing an operation of an output impedance control circuit according to the sixth embodiment of the present invention in cases where an output impedance selection signal of the output impedance control circuit is asserted to an output driver.

FIG. 20 is a timing chart showing an operation of the output impedance control circuit 12 according to the sixth embodiment of the present invention in cases where no output impedance selection signal of the output impedance control circuit 12 is asserted to the output driver 13a of the bus control unit 13, and FIG. 21 is a timing chart showing an operation of the output impedance control circuit 12 according to the sixth embodiment of the present invention in cases where an output impedance selection signal of the output impedance control circuit 12 is asserted to the output driver 13a of the bus control unit 13.

Next, an operation of the microcomputer will be described below.

In general, in cases where an output impedance of the output driver 13a differs from a characteristic impedance of a substrate on which the external memory and/or the ASIC are displaced with the microcomputer, noise occurs due to ringing caused by the reflection of the bus control signals between the microcomputer and the substrate, the system comprising the microcomputer, the external memory and the ASIC is erroneously operated, and the bus control signals output from the CPU 1 are delayed.

As shown in FIG. 15, an equivalent circuit characterized by both an output impedance Ro of the output driver 13a and a characteristic impedance Zo of the substrate is, for example, considered. Also, because an input terminal of the external memory or the ASIC formed of a complementary metal-oxide semiconductor (CMOS) is not terminated, the input terminal of the external memory or the ASIC is substantially opened. Therefore, an output terminal of a signal line of the bus control signals passing through the output driver 13a and the substrate is opened. In this equivalent circuit, a bus control signal having an input waveform is input to the bus control unit 13, is output from the output driver 13a, is transmitted through the substrate during a propagation time period and finally has an output waveform at the output terminal of the signal line.

In cases where Ro=Zo is satisfied in the equivalent circuit shown in FIG. 15, the output impedance of the output driver 13a and the characteristic impedance of the substrate match with each other. In this case, as shown in FIG. 16, the output waveform of the bus control signal agrees with the input waveform of the bus control signal. Therefore, no distortion occurs in the bus control signal during the transmission from the output driver 13a to the external memory or the ASIC.

In contrast, in case of Ro<Zo, the output impedance of the output driver 13a is lower than the characteristic impedance of the substrate. In this case, as shown in FIG. 17, though the output waveform of each bus control signal is rapidly risen up, ringing occurs in the bus control signal. Because the ringing includes a high frequency component, the ringing functions as a noise source. Therefore, the output waveform of the bus control signal is fluctuated. Also, in cases where the ringing extremely occurs, there is a case where the level of the output waveform is lowered to a threshold value at which a low level is judged. In this case, the bus control signal tried to be set to a high level is erroneously judged by the external memory or the ASIC to be a low level. Therefore, the microcomputer is erroneously operated. In particular, the system including the microcomputer has a large number of signal lines such as an address bus and a data bus, and levels of signals in the signal lines are simultaneously changed. In this case, it is important to prevent the occurrence of noise and the erroneous operation.

Also, in case of Ro>Zo, the output impedance of the output driver 13a is higher than the characteristic impedance of the substrate. In this case, as shown in FIG. 18, the output waveform of each bus control signal is slowly risen up. Therefore, the transmission of the bus control signal to the external memory or the ASIC is delayed.

In the sixth embodiment, to prevent the occurrence of noise and the erroneous operation due to the mismatch of the impedance between the output driver 13a and the substrate, the output driver 13a has a plurality of output impedances respectively denoting a driver performance of the microcomputer, and one output impedance nearest to the characteristic impedance of the substrate among the output impedances is selected.

In cases where the characteristic impedance of the substrate calculated in advance is near to 100 Ω, as shown in FIG. 19 and FIG. 20, a selection signal set to a low level is input to the output impedance selection terminal 11, and a reset signal is input to the reset terminal 4. In the output impedance control circuit 12, the selection signal is latched by the reset signal. Because the selection signal latched by the reset signal is set to the low level, no output impedance selection signal is asserted to the bus control unit 13. In other words, an output impedance selection signal set to a low level is output to the bus control unit 13. Therefore, the output impedance of the output driver 13a of the bus control unit 13 is set to 100 Ω.

Also, in cases where the characteristic impedance of the substrate calculated in advance is near to 50 Ω, as shown in FIG. 19 and FIG. 21, a selection signal set to a high level is input to the output impedance selection terminal 11, and a reset signal is input to the reset terminal 4. In the output impedance control circuit 12, the selection signal is latched by the reset signal. Because the selection signal latched by the reset signal is set to the high level, an output impedance selection signal is asserted to the bus control unit 13. In other words, an output impedance selection signal set to a high level is output to the bus control unit 13. Therefore, the output impedance of the output driver 13a of the bus control unit 13 is set to 50 Ω.

As is described above, in the sixth embodiment, because the microcomputer further comprises a hardware configuration of the reset terminal 4, the output impedance selection terminal 11, the output impedance control circuit 12 and the output driver 13a having a plurality of output impedances, one output impedance nearest to the characteristic impedance of the substrate calculated in advance is selected from among the output impedances of the output driver 13a according to the selection signal input to the output impedance control circuit 12. Accordingly, the occurrence of noise, the erroneous operation of the microcomputer and the signal delay due to the mismatch of the output impedance of the output driver 13a and the characteristic impedance of the substrate can be reduced.

In the sixth embodiment, the number of output impedances prepared in the output driver 13a is two. However, it is applicable that three output impedances or more be prepared in the output driver 13a so as to select one output impedance nearest to the characteristic impedance of the substrate from the three output impedances or more. In this case, a plurality of output impedance selection terminals 11 are disposed in the microcomputer so as to output an output impedance selection signal indicating data of a plurality of bits (data "00" denotes the assertion of no output impedance selection signal) from the output impedance control circuit 12, and one output impedance nearest to the characteristic impedance of the substrate is selected from the three output impedances or more according to the output impedance selection signal of a plurality of bits.

Also, in the sixth embodiment, it is applicable that the hardware configuration of the reset terminal 4, the output impedance selection terminal 11, the output impedance control circuit 12 and the output driver 13a having a plurality of output impedances be added to the configuration of the microcomputer of the first, second or fourth embodiment. For example, in cases where the configuration of the microcomputer according to the sixth embodiment is combined with that of the first embodiment, the external area judging unit 2 is added to the configuration of the microcomputer according to the sixth embodiment in the system having both the external memory and the ASIC.

Embodiment 7

Figure 22:
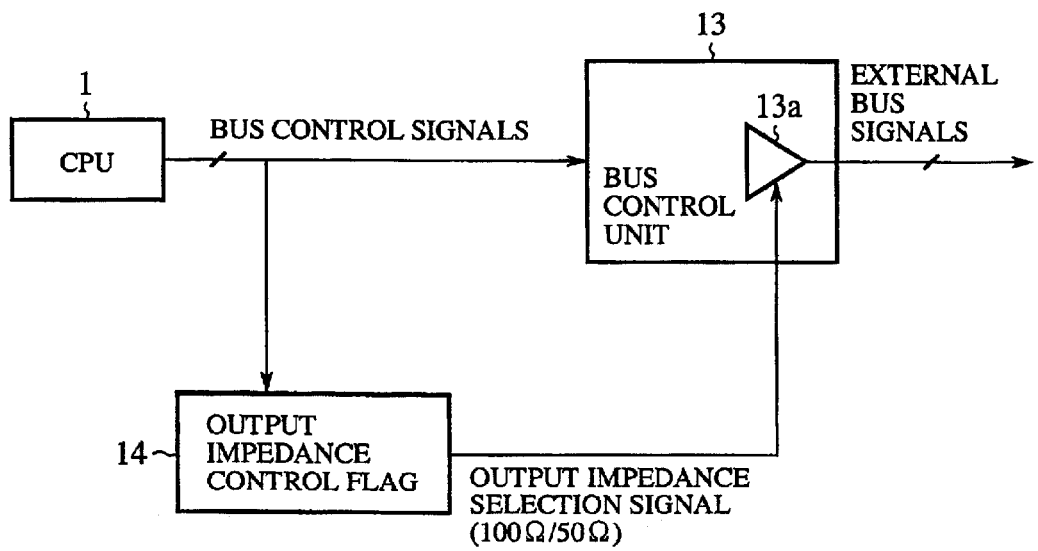
FIG. 22 is a block diagram of a microcomputer according to a seventh embodiment of the present invention.

FIG. 22 is a block diagram of a microcomputer according to a seventh embodiment of the present invention. The constituent elements, which are the same as those shown in FIG. 19, are indicated by the same reference numerals as those of the constituent elements shown in FIG. 19, and additional description of those constituent elements is omitted.

In FIG. 22, 14 indicates an output impedance control flag for outputting an output impedance selection signal to the output driver 13a of the bus control unit 13 according to a level of internal data DB latched by a write signal (or a flag control signal) which is output from the CPU 1 to an internal memory.

Figure 23:
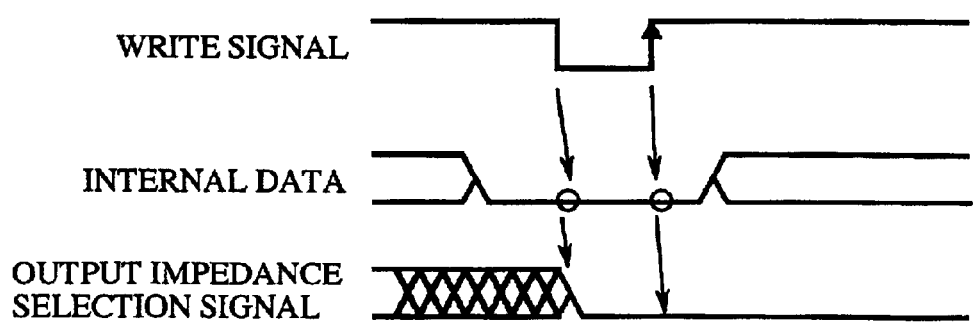
FIG. 23 is a timing chart showing an operation of an output impedance control flag according to the seventh embodiment of the present invention in cases where no output impedance selection signal of the output impedance control flag is asserted to an output driver.
Figure 24:
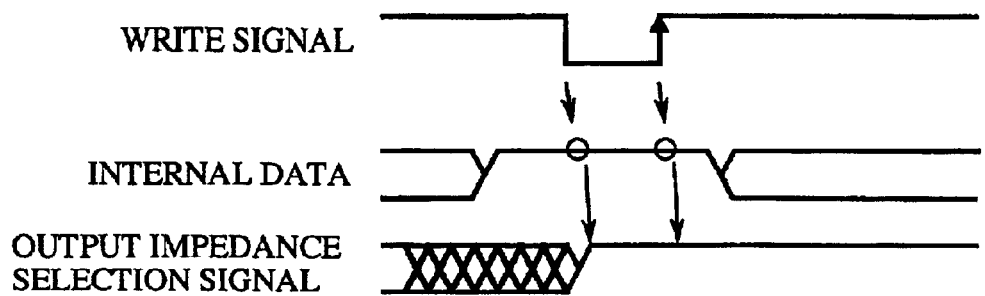
FIG. 24 is a timing chart showing an operation of an output impedance control flag according to the seventh embodiment of the present invention in cases where an output impedance selection signal of the output impedance control flag is asserted to an output driver.

FIG. 23 is a timing chart showing an operation of the output impedance control flag 14 according to the seventh embodiment of the present invention in cases where no output impedance selection signal of the output impedance control flag 14 is asserted to the output driver 13a of the bus control unit 13, and FIG. 24 is a timing chart showing an operation of the output impedance control flag 14 according to the seventh embodiment of the present invention in cases where an output impedance selection signal of the output impedance control flag 14 is asserted to the output driver 13a of the bus control unit 13.

Next, an operation of the microcomputer will be described below.

In the seventh embodiment, one output impedance nearest to the characteristic impedance of the substrate is selected in a software process from a plurality of output impedances.

In cases where the characteristic impedance of the substrate calculated in advance is near to 100 Ω, as shown in FIG. 22 and FIG. 23, internal data DB set in a low level is latched by a write signal output from the CPU 1 to an internal memory, a value "0" of the internal data DB is written to the output impedance control flag 14 by the CPU 1, and no output impedance selection signal is asserted to the bus control unit 13. In other words, an output impedance selection signal set to a low level is output to the bus control unit 13. Therefore, the output impedance of the output driver 13a of the bus control unit 13 is set to 100 Ω.

Also, in cases where the characteristic impedance of the substrate calculated in advance is near to 50 Ω, as shown in FIG. 22 and FIG. 24, internal data DB set in a high level is latched by a write signal output to an internal memory from the CPU 1, a value "1" of the internal data DB is written to the output impedance control flag 14 by the CPU 1, and an output impedance selection signal is asserted to the bus control unit 13. In other words, an output impedance selection signal set to a high level is output to the bus control unit 13. Therefore, the output impedance of the output driver 13a of the bus control unit 13 is set to 50 Ω.

As is described above, in the seventh embodiment, because the microcomputer further comprises a software configuration of the output impedance control flag 14 and a hardware configuration of the output driver 13a having a plurality of output impedances, one output impedance nearest to the characteristic impedance of the substrate calculated in advance is selected from among the output impedances of the output driver 13a according to the value of the output impedance control flag 14. Accordingly, the occurrence of noise, the erroneous operation of the microcomputer and the signal delay due to the mismatch of the output impedance of the output driver 13a and the characteristic impedance of the substrate can be reduced.

In the seventh embodiment, the number of output impedances prepared in the output driver 13a is two. However, it is applicable that three output impedances or more be prepared in the output driver 13a so as to select one output impedance nearest to the characteristic impedance of the substrate from the three output impedances or more. In this case, a plurality of pieces of internal data DB are latched by a plurality of write signals so as to write flag data of a plurality of bits to the output impedance control flag 14, an output impedance selection signal denoting data of a plurality of bits (data "00" denotes the assertion of no output impedance selection signal) is output from the output impedance control flag 14 to the output driver 13a, and one output impedance nearest to the characteristic impedance of the substrate is selected from the three output impedances or more according to the output impedance selection signal of a plurality of bits.

Also, in the seventh embodiment, it is applicable that the software configuration of the output impedance control flag 14 and the hardware configuration of the output driver 13a having a plurality of output impedances be added to the configuration of the microcomputer of the first, third or fifth embodiment. For example, in cases where the configuration of the microcomputer according to the seventh embodiment is combined with that of the first embodiment, the external area judging unit 2 is added to the configuration of the microcomputer according to the seventh embodiment in the system having both the external memory and the ASIC.

What is claimed is:

1. A microcomputer comprising:
   a central processing unit for outputting a plurality of bus control signals;
   an external area judging unit for judging according to one bus control signal output from the central processing unit whether access of the central processing unit to an external storing unit is set or access of the central processing unit to a peripheral unit is set and outputting a bus selection signal according to a judgment result; and
   a bus control unit, in which a bus interface having both a bus timing for the external storing unit and a bus timing for the peripheral unit is disposed, for sending the bus control signals output from the central processing unit to the external storing unit as a plurality of external bus signals based on the bus timing for the external storing unit, in a case where the bus selection signal output from the external area judging unit indicates the access to the external storing unit, to make the central processing unit gain access to the external storing unit, and sending the bus control signals output from the central processing unit to the peripheral unit as a plurality of external bus signals based on the bus timing for the peripheral unit, in a case where the bus selection signal output from the external area judging unit indicates the access to the peripheral unit, to make the central processing unit gain access to the peripheral unit.

2. A microcomputer according to claim 1, further comprising:
   a bus selection enable circuit for permitting or prohibiting the judgment of the external area judging unit according to a selection signal received at an external bus timing selection terminal, and outputting an enable signal to the external area judging unit, in a case where the judgment of the external area judging unit is prohibited, to make the external area judging unit output the bus selection signal indicating the access to the external storing unit.

3. A microcomputer according to claim 1, further comprising:
   a bus selection enable flag, set according to a flag control signal output from the central processing unit, for permitting or prohibiting the judgment of the external area judging unit, and outputting an enable signal to the external area judging unit, in a case where the judgment of the external area judging unit is prohibited, to make the external area judging unit output the bus selection signal indicating the access to the external storing unit.

4. A microcomputer according to claim 1, further comprising:
   a time control circuit for outputting a control signal to the bus control unit according to a time adjustment signal received at a time adjustment terminal to make the bus control unit adjust a setup time or a hold time in the bus timing for the peripheral unit.

5. A microcomputer according to claim 1, further comprising:
   a time control flag, set according to a flag control signal output from the central processing unit, for outputting a control signal to the bus control unit to make the bus control unit adjust a setup time or a hold time in the bus timing for the peripheral unit.

6. A microcomputer according to claim 1, further comprising:
   an output impedance control circuit for outputting an output impedance selection signal according to a selection signal received at an output impedance select terminal, wherein the bus control unit comprises
   an output driver, having a plurality of output impedances, for selecting one output impedance from the output impedances according to the output impedance selection signal output from the output impedance control circuit, and outputting the bus control signals output from the central processing unit to a substrate as the external bus signals based on the selected output impedance.

7. A microcomputer according to claim 1, further comprising:

an output impedance control flag, set according to a flag control signal output from the central processing unit, for outputting an output impedance selection signal, wherein the bus control unit comprises an output driver, having a plurality of output impedances, for selecting one output impedance from the output impedances according to the output impedance selection signal output from the output impedance control flag, and outputting the bus control signals output from the central processing unit to a substrate as the external bus signals based on the selected output impedance.

8. A microcomputer comprising:

a central processing unit for outputting a plurality of bus control signals;

an output impedance control circuit for outputting an output impedance selection signal according to a selection signal received at an output impedance select terminal; and a bus control unit, in which an output driver having a plurality of output impedances is disposed, for selecting one output impedance from the output impedances according to the output impedance selection signal output from the output impedance control circuit, and outputting the bus control signals output from the central processing unit to a substrate as a plurality of external bus signals based on the selected output impedance.

9. A microcomputer comprising:

a central processing unit for outputting a plurality of bus control signals;

an output impedance control flag, set according to a flag control signal output from the central processing unit, for outputting an output impedance selection signal; and a bus control unit, in which an output driver having a plurality of output impedances is disposed, for selecting one output impedance from the output impedances according to the output impedance selection signal output from the output impedance control flag, and outputting the bus control signals output from the central processing unit to a substrate as a plurality of external bus signals based on the selected output impedance.

* * * * *